(12) United States Patent
Trott et al.

(10) Patent No.: US 7,308,167 B2
(45) Date of Patent: Dec. 11, 2007

(54) OPTICAL ASSEMBLY WITH OPTOELECTRONIC DEVICE ALIGNMENT

(75) Inventors: Gary R. Trott, San mateo, CA (US); Russell A. Budd, North Salen, NY (US); Jeannine M. Trewhella, Peekskill, NY (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 10/931,713

(22) Filed: Sep. 1, 2004

(65) Prior Publication Data

US 2006/0045410 A1    Mar. 2, 2006

(51) Int. Cl.
G02B 6/12 (2006.01)
G02B 6/30 (2006.01)

(52) U.S. Cl. .............................. 385/14; 385/31; 385/49

(58) Field of Classification Search ...................... None
See application file for complete search history.

(56) References Cited

U.S. PATENT DOCUMENTS

| | | | | |
|---|---|---|---|---|
| 5,195,150 | A * | 3/1993 | Stegmueller et al. | 385/33 |
| 5,418,870 | A * | 5/1995 | Keck et al. | 385/31 |
| 6,095,697 | A * | 8/2000 | Lehman et al. | 385/88 |
| 6,370,292 | B1 * | 4/2002 | Strake | 385/14 |
| 6,722,792 | B2 | 4/2004 | Raj et al. | |
| 6,741,777 | B2 * | 5/2004 | Jewell et al. | 385/49 |
| 6,754,407 | B2 * | 6/2004 | Chakravorty et al. | 385/14 |
| 6,793,409 | B2 * | 9/2004 | Wickman et al. | 385/88 |
| 6,987,906 | B2 * | 1/2006 | Nakama et al. | 385/31 |
| 2003/0198439 | A1 * | 10/2003 | Hiramatsu | 385/39 |

FOREIGN PATENT DOCUMENTS

EP    1160602 A1    5/2001

OTHER PUBLICATIONS

Proceedings—Electronic Components and technology Conference 2000. IEEE, Piscataway, NJ, USA, 00CB37070; pp. 736-741, "Low-Cost Laser Modules for SMT," by W. Rehm, et al.
IEEE Transactions on Advanced Packaging, vol. 26, No. 2; May 2003, pp. 122-127. "SMT-Compatible Large-Tolerance Opto-bump Interface for Interchip Optical Interconnections," by Y. Ishii, S. Koike, Y. Arai & Y. Ando.
J. Lightwave Technology, vol. 21, No. 1; Jan. 2003, pp. 275-280. "Fully SMT-Compatible Optical I/O Package with Microlens Array Interface," by Y. Ishii, N. Tanaka, T. Sakamoto, and H. Takahara.
http://www.primarion.com/products/presentationss/index.php white papers by Primarion on optics to the chip, Feb. 2003.
3rd Optoelectronics Packaging Workshop Feb. 26, 2002; hosted by TechSearch International. "Optoelectronics Packaging Trends in Japan," presentation by H. Takahara.

* cited by examiner

*Primary Examiner*—Sung Pak

(57) ABSTRACT

At least one optical waveguide is supported on a substrate and has a plurality of key apertures formed in a complaint element thereof. An optoelectronic device such as a vertical cavity surface emitting laser (VCSEL) has a plurality of projections that register with corresponding key apertures to position the optoelectronic device in a predetermined alignment relative to the optical waveguide.

20 Claims, 1 Drawing Sheet

OPTICAL ASSEMBLY WITH OPTOELECTRONIC DEVICE ALIGNMENT

STATEMENT AS TO RIGHTS TO INVENTIONS MADE UNDER FEDERALLY SPONSORED RESEARCH AND DEVELOPMENT

The United States may have rights to certain inventions disclosed herein under DARPA Contract MDA972-03-004.

BACKGROUND

The bandwidth requirement of chip-to-chip interconnections within large computer systems and network switches continues to grow at a very rapid pace. Current electrical interconnection schemes are experiencing bottlenecks due to the physical constraints of large, massively parallel bundles of electrical cables, connector size and/or limits on electrical bandwidth due to power and speed considerations. This has led to the increasing utilization of fiber optic interconnections which are preferred for long haul telecommunications links. Fiber optic interconnections can also be advantageously employed to link computer racks or shelves.

As central processing unit (CPU) clock speed continues to increase, and integrated circuits continue to become increasingly miniaturized, optical connections can be employed on circuit board assemblies to accommodate increasing bandwidth requirements. In addition to conductive circuit traces, optical waveguides have been employed on circuit board assemblies in lieu of discrete optical fibers. It is possible to use batch fabrication methods to apply and pattern polymer materials to form the desired optical waveguides. Thus arrays of optical waveguides can be formed on circuit board assemblies to augment traditional conductive paths. Electrical connections between conductive paths and other electrical devices are typically made with solder or removable connectors that do not require a high degree of mechanical alignment in order to function properly. However, an optoelectronic device, such as vertical cavity surface emitting laser (VCSEL), requires precision alignment with an optical waveguide or another optoelectronic device, such as an avalanche photo-diode (APD), to ensure integrity of the signal transmission with minimal optical losses. For example, optoelectronic devices typically require alignment accuracy on the order of a few microns depending upon the specific optical design and implementation. This is significantly greater alignment accuracy than needed for electrical interconnections. Thus, there is a need for an optical assembly that can simultaneously achieve electrical and optical interconnections with the latter being achieved with a high degree of accuracy.

An alignment maintenance problem that needs to be addressed in an optical assembly that provides simultaneous electrical and optical interconnections arises from the fact that the different materials in the assembly have different coefficients of thermal expansion. Thus it is difficult to maintain alignment of optoelectronic devices within a few microns over a full range of fabrication and operating temperatures. For example if the design of the optical assembly requires an elevated temperature during fabrication, and it thereafter cools to ambient temperature, the optoelectronic device may become misaligned relative to its waveguide. Thus the optical link may not achieve signal transfer integrity during subsequent operation. In addition, as the temperature within a computer or switch cabinet cycles over time during normal operation the optoelectronic device may also become misaligned and therefore fail to correctly perform its intended function.

An optical assembly that can simultaneously achieve electrical and optical interconnections must be designed so that any sensitive components such as lenses are not scratched during handling. Moreover, it should be capable of accommodating arrays of optoelectronic devices.

SUMMARY OF THE INVENTION

In accordance with the present invention an optical assembly includes a substrate and at least one optical waveguide supported on the substrate. The optical waveguide has a compliant element with a plurality of key apertures formed therein. The optical assembly further includes an optoelectronic device having a plurality of projections that register with corresponding key apertures to position the optoelectronic device in a predetermined alignment relative to the optical waveguide.

In accordance with the present invention an optical assembly includes a first substrate having at least a first conductive path. At least one optical waveguide is supported on the first substrate and has a plurality of key apertures formed therein. The optical assembly further includes an optoelectronic device having a plurality of projections that register with corresponding key apertures to position the optoelectronic device in a predetermined alignment relative to the optical waveguide. A second substrate supports the optoelectronic device and has at least a second conductive path. A plurality of electrical connections between the first and second conductive paths hold the optoelectronic device in the predetermined alignment relative to the optical waveguide.

DETAILED DESCRIPTION

Figure 1:
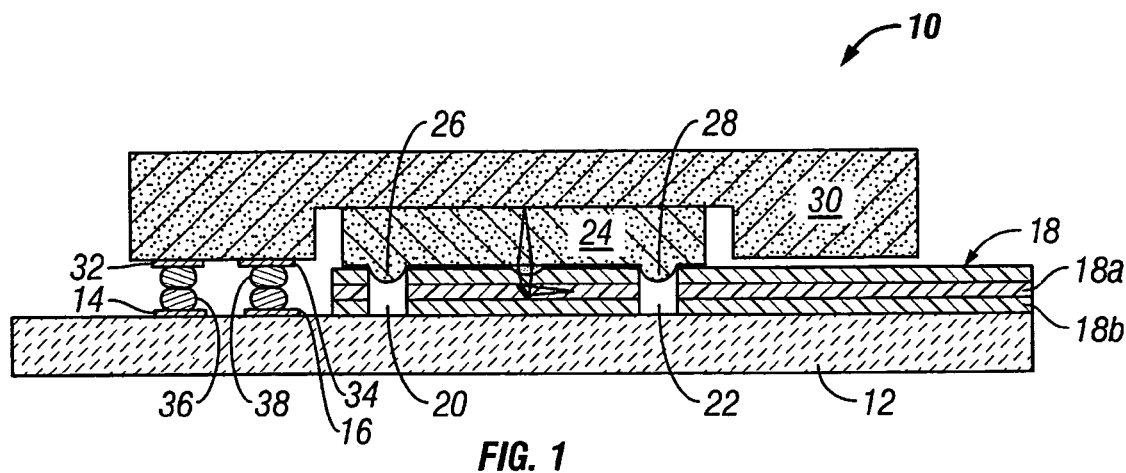
FIG. 1 is a diagrammatic vertical cross-section of an embodiment of the optical assembly of the present invention.

Referring to FIG. 1, in accordance with an embodiment of the invention, an optical assembly 10 includes a lower substrate 12 having conductive paths 14 and 16 formed on an upper side thereof. An optical waveguide 18 is also formed on the upper side of the first substrate 12. The optical waveguide 18 is made of optically transmissive polymer materials having indicies of refraction selected to provide substantially total internal reflection of light transmitted within an internal core 18a surrounding by an external cladding 18b. The optical waveguide 18 has a plurality of key apertures 20 and 22 formed therein. The optical assembly 10 further includes an optoelectronic device 24 having a plurality of projections 26 and 28 that register with corresponding key apertures 20 and 22, respectively, to position the optoelectronic device 24 in a predetermined alignment relative to the optical waveguide 18.

An upper substrate 30 supports the optoelectronic device 24 and has conductive paths 32 and 34 formed on an underside thereof. The conductive paths 14 and 16 are electrically connected to the conductive paths 32 and 34 to hold the optoelectronic device 24 in the predetermined alignment relative to the optical waveguide 18. The term "conductive paths" as used herein includes not only conductive traces, but in addition, conductive pads, solder pads, pins and other suitable electrically conductive structures that enable electrical connections to be made between the lower substrate 12 and the upper substrate 30.

Figure 2:
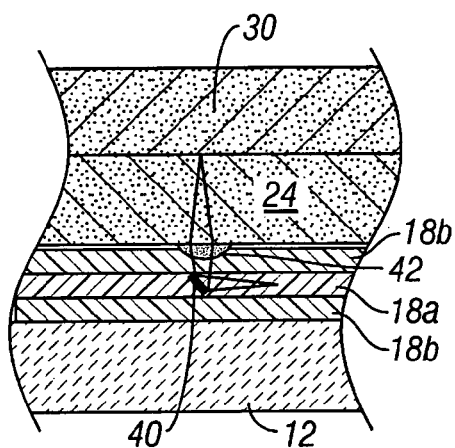
FIG. 2 is an enlarged portion of FIG. 1 illustrating the reflecting mirror in the optical waveguide and the lens in the optoelectronic device of the optical assembly of FIG. 1.

In accordance with the embodiment of FIG. 1 mating solder ball joints 36 and 38 are utilized to permanently hold the optoelectronic device 24 so that an angled turning or reflecting mirror 40 (FIG. 2) of the optical waveguide 18 and a lens 42 of the optoelectronic device 24 are accurately mated to a tolerance of a few microns. This ensures signal transfer integrity and minimizes optical losses when the optoelectronic device 24 (FIG. 1) is held in the predetermined alignment relative to the optical waveguide 18. In FIG. 2 the converging lines leading to the mirror 40, between the mirror 40 and the lens 42, and from the lens 42 diagrammatically represent the light path relative to these optical elements.

The optical waveguide 18 (FIG. 1) and the conductive paths 14 and 16 are formed utilizing known batch fabrication methods. The key apertures 20 and 22 can be formed by screening methods or suitable laser excavation and may be recesses that partially extend through the optical waveguide 18, or holes that extend completely through the waveguide 18. The lower substrate 12 may be conventional copper clad fiberglass laminate used in fabricating printed circuit boards or any other suitable substrate such as silicon, ceramic or polyimide. The upper substrate 30 can be a silicon, ceramic or polyimide block, an integrated circuit or a mechanical structure. The projections 26 and 28 are preferably tapered and have a maximum outer diameter larger than the maximum diameter of the key apertures 20 and 22 in order to achieve a self centering effect when they are mated, and thus achieve the precision alignment desired. In the illustrated embodiment the projections 26 and 28 are rounded posts and the key apertures 20 and 22 have cylindrical configurations, but a wide variety of suitable configurations can be used, such as conical projections and cylindrical key apertures.

The optical assembly 10 (FIG. 1) simplifies the initial alignment process required to achieve tolerances to within several microns. Precision alignment is maintained during fabrication at elevated temperatures and subsequent cooling, and during temperature changes encountered during normal operation, all despite differential thermal expansion of the various materials in the optical assembly 10.

The key apertures 20 and 22 (FIG. 1) and the projections 26 and 28 are fabricated at the same time and in the same batch processes as the waveguide 18 and the optoelectronic device 24. By integrating special features onto these devices there is no need to handle additional parts. Furthermore, because the mechanical interlock provided by the projections 26 and 28 can be fabricated in the same processes as the key apertures 20 and 22, placement accuracy of the optoelectronic device 24 is very high. By similar methods the key apertures 20 and 22 are accurately located relative to the reflecting mirror 40 (FIG. 2) of the optical waveguide 18. Furthermore, since the mechanical alignment features are located on the waveguide 18 (FIG. 1) and the optoelectronic device 24 themselves, the alignment of the solder ball joints 36 and 38 is decoupled from the tight optical alignment requirements. This eliminates stacking up of alignment tolerances typically caused by multiple masking steps registering devices to solder pads. This is especially important where, as is the case with the optical assembly 10, the electrical connection is not made directly to the optoelectronic device 24 but to the upper substrate 30 to which it is attached. It is also especially important where, as is the case with the optical assembly 10, the waveguide 18 is only coarsely aligned to the conductive paths 14 and 16 on the lower substrate 12. Moreover, the compliant physical properties of the polymer optical waveguide 18 advantageously accommodates the very rigid semi-conductor material of the optoelectronic device 24. Typically, the closer the projection/aperture junction is to the optical core 18a the more accurate will be the alignment between the optoelectronic device 24 and the optical waveguide 18.

In accordance with the invention, the fabrication of a plurality of projections such as 26 and 28 on an optoelectronic device such as 24 is referenced very accurately to the optical axis of the optoelectronic device 24. Corresponding key apertures such as 20 and 22 are fabricated in an optical waveguide such as 18 that are very accurately referenced to its optical coupling axis. Tapering or rounding the projections 26 and 28 and making them slightly larger than the key apertures 20 and 22 allows for a self-centering action when the optoelectronic device 24 is mated to the optical waveguide 18. This brings the optoelectronic device 24 into its ideal position relative to the optical waveguide 18. Once the projections 26 and 28 become registered in their respective key apertures 20 and 22 the optoelectronic device is firmly held in alignment when the electrically conductive connection, such as the solder ball joints 36 and 38, between the upper and lower substrates 12 and 30 cools and solidifies.

The mating of the projections 26 and 28 and the key apertures 20 and 22, along with the solder ball joints 36 and 38, provide local mechanical control to facilitate both initial alignment and maintenance of alignment over time, regardless of temperature changes during the product life cycle. Finally, because the lens 42 is recessed below the level of the outer ends of the projections 26 and 28 it is protected from scratches. The plurality of projections 26 and 28 extend from the underside of the optoelectronic device 24 beyond the lens 42 so that the lens 42 is protected from scratches during handling of the optoelectronic device 24.

Figure 3:
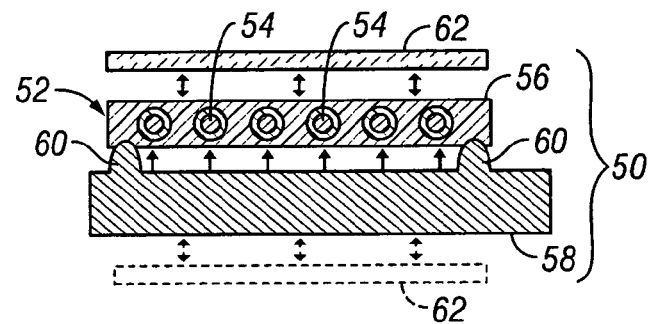
FIG. 3 is a diagrammatic vertical cross-section of an alternate embodiment of the optical assembly of the present invention which does not employ the second substrate of the embodiment of FIGS. 1 and 2.

Referring to FIG. 3, embodiment 50 in accordance with the invention comprises an optical waveguide 52 that includes a generally planar array of parallel extending discrete glass or plastic optical fibers 54 encased within a compliant element in the form of a cladding 56 of polymer film. An optoelectronic device 58 has a plurality of tapered projections 60 that register with key apertures (not visible) formed in the polymer cladding 56. The key apertures may be pre-formed by mechanical drilling, punching, or by laser excavation of the polymer cladding 56 at precise locations. Alternatively, the key apertures may be formed when the rigid projections 60 pierce into the polymer cladding 56. Lenses, mirrors or other optical functional elements (not illustrated in FIG. 3) couple light between the optoelectronic device 58 and the discrete optical fibers 54 and/or other optical waveguides (not illustrated). A single substrate 62 is attached to and supports either the optical waveguide 52 or the optoelectronic device 58. There is no second substrate in embodiment 50 and therefore, typically, no need for any electrical connections between conductive paths on the two substrates.

Figure 4:
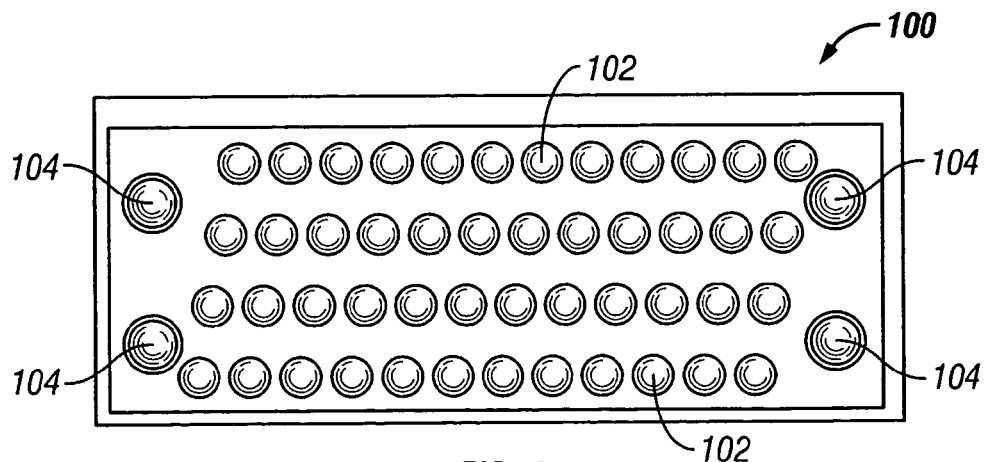
FIG. 4 is a top plan view of another embodiment of the present invention incorporating an array of optoelectronic devices.

While several exemplary embodiments in accordance with the invention have been described, modifications and adaptations thereof will readily occur to those skilled in the art. For example, FIG. 4 is a top plan view of another optical assembly 100 similar in construction to the optical assembly 10. The optical assembly 100 incorporates a generally rectangular array of forty-eight optoelectronic devices each having a lens 102. Four lens posts 104 are located at respective corners of the optical assembly 100. Various optoelectronic devices can be accommodated including, but not limited to, a light emitting diode (LED), a Fabry-Perot (FP) laser diode, a distributed feedback (DFB) laser diode, a vertical cavity surface emitting laser (VCEL), a positive-instrinsic-negative (PIN) photo diode, an integrated detector/preamplifier (IDP), an avalanche photo-diode (APD), a silicon integrated circuit for a laser driver, and a liquid crystal device. Conventional re-flowed solder joints or conductive adhesive such as conductive epoxy can be used in lieu of the solder ball joints 36 and 38. While the optical waveguide 18 is illustrated in the form of polymer films 18a and 18b deposited onto the upperside of the lower substrate 12, other forms of optical waveguides can be used, such as a polymer-filled groove, discrete plastic optical fiber, or discrete glass optical fiber. Other optical functional elements besides a turning mirror and a lens can be utilized in the optical assembly and benefit from the precision alignment, including, but not limited to, a polarizer and a wavelength filter. Therefore, the protection afforded our invention is limited only by the scope of the following claims.

We claim:

1. An optical assembly, comprising:
   a substrate;
   at least one optical waveguide supported on the substrate and having a compliant element with a plurality of key apertures formed therein;
   an optoelectronic device having a plurality of projections that mate with corresponding key apertures to position the optoelectronic device in a predetermined alignment relative to the optical waveguide, and wherein the projections are tapered, and have a maximum outer diameter larger than a maximum diameter of the key apertures.

2. The optical assembly of claim 1 and further comprising a second substrate supporting the optoelectronic device.

3. The optical assembly of claim 2 and further comprising at least a first conductive path on the substrate that supports the optical waveguide and at least a second conductive path on the second substrate.

4. The optical assembly of claim 3 further comprising:
   a plurality of electrical connections between the first and second conductive paths holding the optoelectronic devices in the predetermined alignment relative to the optical waveguide.

5. The optical assembly of claim 1 wherein the compliant element of the optical waveguide is made of a polymer material and the optical waveguide includes at least one glass component.

6. The optical assembly of claim 1 and further comprising a first optical functional element in the optical waveguide and a second optical functional element in the optoelectronic device that are accurately mated to ensure integrity of a signal transmission with minimal optical losses when the optoelectronic device is held in the predetermined alignment relative to the optical waveguide.

7. The optical assembly of claim 1 wherein the optoelectronic device is selected from the group consisting of a light emitting diode (LED), a Fabry-Perot (FP) laser diode, a distributed feedback (DFB) laser diode, a vertical cavity surface emitting laser (VCEL), a positive-intrinsic-negative (PIN) photodiode, an integrated detector/preamplifier (IDP), an avalanche Photo-diode (APD), a silicon integrated circuit for a laser driver, and a liquid crystal device.

8. The optical assembly of claim 4 wherein the plurality of electrical connections comprises a plurality of solder ball joints.

9. The optical assembly of claim 1 wherein the optoelectronic device includes a lens formed on an underside of the optoelectronic device and the plurality of projections extend from the underside of the optoelectronic device beyond the lens so that the lens is protected from scratches during handling of the optoelectronic device.

10. The optical assembly of claim 2 wherein the second substrate is an integrated circuit device.

11. The optical assembly of claim 1 wherein the key apertures are holds that extend through the optical waveguide.

12. An optical assembly, comprising:
    a first substrate having at least a first conductive path;
    at least one optical waveguide supported on the first substrate and having a plurality of key apertures formed therein and the at least one optical wave guide having a turning mirror positioned in a core thereof;
    an optoelectronic device having a plurality of projectionsthat mate with corresponding key apertures to position the optoelectronic device in a predetermined alignment relative to the optical waveguide;
    a second substrate supporting the optoelectronic device and having at least a second conductive path; and
    a plurality of electrical connections between the first and second conductive paths holding the optoelectronic device in the predetermined alignment relative to the optical waveguide so that the turning mirror and lens are accurately mated to ensure integrity of a signal transmission between the core and the optoelectronic device with minimal optical losses.

13. The optical assembly of claim 12 and further comprising a first optical functional element in the optical waveguide and a second optical functional element in the optoelectronic device that are accurately mated to ensure integrity of a signal transmission with minimal optical losses when the optoelectronic device is held in the predetermined alignment relative to the optical waveguide.

14. The optical assembly of claim 12 wherein the optoelectronic device is selected from the group consisting of a light emitting diode (LED), a Fagry-Perot (FP) laser diode, a distributed feedback (DFB) laser diode, a vertical cavity surface emitting laser (VCEL), a positive-intrinsic-negative (PIN) photodiode, an integrated detector/preamplifier (IDP), an avalanche photo-diode (APD), a silicon integrated circuit for a laser driver, and a liquid crystal device.

15. The optical assembly of claim 12 wherein the conductive connecting means comprises a plurality of solder ball joints.

16. The optical assembly of claim 12 wherein the optoelectronic device includes a lens formed on an underside of the optoelectronic device and the plurality of projections extend from the underside of the optoelectronic device beyond the lens so that the lens is protected from scratches during handling of the optoelectronic device.

17. The optical assembly of claim 12 wherein the optical waveguide has a compliant element and the key apertures are formed in the compliant element.

18. An optical assembly, comprising:
    a first substrate having at least a first conductive path;

at least one optical waveguide supported on the first substrate and having a plurality of key apertures formed in a compliant element thereof, and the optical waveguide having a turning mirror positioned in a core thereof;

an optoelectronic device selected from the group consisting of a light emitting diode (LED), a Fabry-Perot (FP) laser diode, a distributed feedback (DFB) laser diode, a vertical cavity surface emitting laser (VCEL), a positive-intrinsic-negative (PIN) photo diode, an integrated detector/preamplifier (IDP), an avalanche photo-diode (APD), a silicon integrated circuit for a laser driver, and a liquid crystal device, the optoelectronic device having a plurality of projections that register with corresponding key apertures to position the optoelectronic device in a predetermined alignment relative to the optical waveguide, the optoelectronic device having a lens formed on an underside of the optoelectronic device and the projections extending from the underside of the optoelectronic device beyond the lens so that the lens is protected from scratches during handling of the optoelectronic device;

a second substrate supporting the optoelectronic device and having at least a second conductive path; and a plurality of electrical connections between the first and second conductive paths holding the optoelectronic device in the predetermined alignment relative to the optical waveguide so that the turning mirror and lens are accurately mated to ensure integrity of a signal transmission between the core and the optoelectronic device with minimal optical losses, the electrical connections being selected from the group consisting of solder ball joints, re-flowed solder joints and conductive epoxy.

19. An optical assembly, comprising:

an optical waveguide having at least one glass element and a compliant element;

an optoelectronic device having a plurality of projections that extend into and mate with the compliant element to position the optoelectronic device in a predetermined alignment relative to the optical waveguide wherein the projections are tapered, and have a maximum outer diameter larger than a maximum diameter of the key apertures; and a substrate attached to the optoelectronic device or the optical waveguide.

20. An optical assembly, comprising:

a substrate;

at least one optical waveguide supported on the substrate and having a compliant element with a plurality of key apertures formed therein; and an optoelectronic device having a plurality of projections that mate with corresponding key apertures to position the optoelectronic device in a predetermined alignment relative to the optical waveguide, wherein the projections are rounded, and have a maximum outer diameter larger than a maximum diameter of the key apertures.

* * * * *

UNITED STATES PATENT AND TRADEMARK OFFICE
CERTIFICATE OF CORRECTION

PATENT NO. : 7,308,167 B2  Page 1 of 1
APPLICATION NO. : 10/931713
DATED : December 11, 2007
INVENTOR(S) : Trott et al.

It is certified that error appears in the above-identified patent and that said Letters Patent is hereby corrected as shown below:

In column 6, line 4, in Claim 7, delete "Photo-diode" and insert -- photo-diode --, therefor.

In column 6, line 48, in Claim 14, delete "Fagry-Perot" and insert -- Fabry-Perot --, therefor.

Signed and Sealed this

Fifth Day of August, 2008

JON W. DUDAS
*Director of the United States Patent and Trademark Office*